United States Patent
Zhang et al.

(10) Patent No.: US 10,132,914 B2
(45) Date of Patent: Nov. 20, 2018

(54) TARGET DEVICE POSITIONING METHOD AND MOBILE TERMINAL

(71) Applicant: Huawei Technologies Co., Ltd., Shenzhen (CN)

(72) Inventors: Yajun Zhang, Shenzhen (CN); Xiaoping Zhang, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/517,774

(22) PCT Filed: Oct. 8, 2014

(86) PCT No.: PCT/CN2014/088139
§ 371 (c)(1),
(2) Date: Apr. 7, 2017

(87) PCT Pub. No.: WO2016/054773
PCT Pub. Date: Apr. 14, 2016

(65) Prior Publication Data
US 2017/0307722 A1 Oct. 26, 2017

(51) Int. Cl.
*G01S 5/02* (2010.01)
*H04M 1/725* (2006.01)
(Continued)

(52) U.S. Cl.
CPC ......... *G01S 5/0242* (2013.01); *H04M 1/7253* (2013.01); *H04W 4/02* (2013.01); *H04W 4/029* (2018.02); *G01S 5/0278* (2013.01)

(58) Field of Classification Search
None
See application file for complete search history.

(56) References Cited

U.S. PATENT DOCUMENTS

| 6,288,675 B1 | 9/2001 | Maloney |
| 7,409,226 B1 | 8/2008 | Stevenson |

(Continued)

FOREIGN PATENT DOCUMENTS

| CN | 102722184 A | 10/2012 |
| CN | 103889049 A | 6/2014 |

(Continued)

OTHER PUBLICATIONS

Machine Translation and Abstract of Chinese Publication No. CN102722184, Oct. 10, 2012, 10 pages.

(Continued)

*Primary Examiner* — Anthony Addy
*Assistant Examiner* — Donald H Braswell
(74) *Attorney, Agent, or Firm* — Conley Rose, P.C.

(57) ABSTRACT

A target device positioning method and a mobile terminal are provided. The mobile terminal determines, according to obtained measurement signals sent by a target device from a trigger moment to a current measurement moment, azimuths of the target device relative to the mobile terminal at the moments, obtains an original motion trail of the target device from the trigger moment to the current measurement moment, determines an effective motion trail of the target device according to the original motion trail and change rates of the azimuths of the target device relative to the mobile terminal at the moments, performs matching with a map according to an azimuth of the target device relative to the mobile terminal at the current measurement moment and the effective motion trail of the target device, to determine location information of the target device, and displays the location information of the target device.

14 Claims, 8 Drawing Sheets

(51) Int. Cl.
*H04W 4/029* (2018.01)
*H04W 4/02* (2018.01)

(56) References Cited

U.S. PATENT DOCUMENTS

| | | |
|---|---|---|
| 2002/0105442 A1 | 8/2002 | Flick |
| 2004/0000993 A1 | 1/2004 | Lu |
| 2011/0237274 A1 | 9/2011 | Wong et al. |
| 2014/0171107 A1* | 6/2014 | Kao .................. G01C 21/206 455/456.1 |
| 2014/0204902 A1* | 7/2014 | Maltsev ............ H04W 36/0083 370/331 |
| 2014/0323162 A1* | 10/2014 | Ezra ................... G01S 5/0072 455/457 |

FOREIGN PATENT DOCUMENTS

| | | |
|---|---|---|
| CN | 103995249 A | 8/2014 |
| CN | 104065712 A | 9/2014 |
| EP | 1621895 A1 | 2/2006 |
| WO | 2007118108 A2 | 10/2007 |

OTHER PUBLICATIONS

Machine Translation and Abstract of Chinese Publication No. CN103995249, Aug. 20, 2014, 10 pages.
Machine Translation and Abstract of Chinese Publication No. CN104065712, Sep. 24, 2014, 8 pages.
Foreign Communication From a Counterpart Application, Chinese Application No. 201480045614.X, Chinese Office Action dated May 18, 2017, 5 pages.
Foreign Communication From a Counterpart Application, European Application No. 14903786.3, Extended European Search Report dated Aug. 11, 2017, 8 pages.
Foreign Communication From a Counterpart Application, PCT Application No. PCT/CN2014/088139, English Translation of International Search Report dated Jun. 19, 2015, 2 pages.
Foreign Communication From a Counterpart Application, PCT Application No. PCT/CN2014/088139, English Translation of Written Opinion dated Jun. 19, 2015, 6 pages.

* cited by examiner

TARGET DEVICE POSITIONING METHOD AND MOBILE TERMINAL

CROSS-REFERENCE TO RELATED APPLICATIONS

This application is a national stage application of International Patent Application No. PCT/CN2014/088139, filed on Oct. 8, 2014, which is hereby incorporated by reference in its entirety.

TECHNICAL FIELD

Embodiments of the disclosure relate to wireless positioning technologies, and in particular, to a target device positioning method and a mobile terminal.

BACKGROUND

With development of short range communications technologies, there are an increasing number of anti-lost target devices based on the short range communications technologies. Commonly used short range communications technologies include a Bluetooth® with low energy (BLE) technology and a Wireless Fidelity (WI-FI) technology. The anti-lost target device is, for example, a tracking label, a child anti-lost wristband, or a wrist watch. The anti-lost target device may be an independent device, and may be carried on an anti-lost object. The anti-lost object may be a person or another object. The anti-lost target device has a short range communications function, and can establish a short range communications connection to a mobile terminal carried by a user. When a distance between the anti-lost target device and the mobile terminal exceeds a particular threshold, strength of a wireless signal of the short range communications connection established between the anti-lost target device and the mobile terminal weakens, and the mobile terminal or the anti-lost target device sends a prompt warning, for example, notifies, by means of a sound, the user that the anti-lost target device is moving away from the user. After hearing the warning, the user finds that the anti-lost target device is moving away from the user, and attempts to look for the anti-lost target device.

In the prior art, a wireless signal attenuation characteristic is used to determine a distance between a user and an anti-lost object by using a change of strength of a wireless signal between an anti-lost target device and a mobile terminal. When the mobile terminal is moving away from the anti-lost target device, strength of a signal received by the mobile terminal weakens. When the mobile terminal approaches the anti-lost target device, the strength of the signal received by the mobile terminal is enhanced. In the prior art, relying on signal strength of a wireless signal, only a distance between the anti-lost target device and the mobile terminal can be determined, but a specific location of the anti-lost target device cannot be determined, thereby bringing particular uncertainty and blindness to searching for the anti-lost target device by the user.

SUMMARY

A target device positioning method and a mobile terminal provided in embodiments of the disclosure can accurately position a location of a target device, so that a user can quickly and accurately find the target device according to the location of the target device.

A first aspect of the disclosure provides a target device positioning method, including obtaining, by a mobile terminal, measurement signals sent by a target device from a trigger moment to a current measurement moment, and determining azimuths of the target device relative to the mobile terminal at the trigger and current measurement moments according to the measurement signals; obtaining, by the mobile terminal, an original motion trail of the target device from the trigger moment to the current measurement moment; determining, by the mobile terminal, an effective motion trail of the target device according to the original motion trail and change rates of the azimuths of the target device relative to the mobile terminal at the moments; performing, by the mobile terminal, matching with a map according to an azimuth of the target device relative to the mobile terminal at the current measurement moment and the effective motion trail of the target device, to determine location information of the target device at the current measurement moment, and displaying the location information of the target device at the current measurement moment.

With reference to the first aspect of the disclosure, in a first possible implementation manner of the first aspect of the disclosure, obtaining, by the mobile terminal, an original motion trail of the target device from the trigger moment to the current measurement moment includes: receiving, by the mobile terminal, motion data of the target device from the trigger moment to the current measurement moment, and generating the original motion trail according to the motion data of the target device from the trigger moment to the current measurement moment.

With reference to the first aspect of the disclosure, in a second possible implementation manner of the first aspect of the disclosure, obtaining, by the mobile terminal, an original motion trail of the target device from the trigger moment to the current measurement moment includes receiving, by the mobile terminal, the original motion trail sent by the target device, where the original motion trail is generated by the target device according to motion data that is of the target device from the trigger moment to the current measurement moment and obtained by means of measurement.

With reference to the first possible implementation manner of the first aspect of the disclosure, in a third possible implementation manner of the first aspect of the disclosure, the method further includes determining, by the mobile terminal, whether a motion status of the target device at the trigger moment is the same as a motion status of the mobile terminal at the trigger moment according to the motion data of the target device at the trigger moment and motion data of the mobile terminal at the trigger moment; and determining, by the mobile terminal, to position the target device if the motion status of the target device at the trigger moment is different from the motion status of the mobile terminal at the trigger moment.

With reference to the first aspect of the disclosure, in a fourth possible implementation manner of the first aspect of the disclosure, the method further includes determining, by the mobile terminal, whether strength of a received signal sent by the target device at the trigger moment is less than a preset received signal strength threshold; and determining, by the mobile terminal, a position of the target device if the strength of the signal is less than the preset received signal strength threshold.

With reference to the first aspect of the disclosure and the first to fourth possible implementation manners of the first aspect of the disclosure, in a fifth possible implementation manner of the first aspect of the disclosure, before performing, by the mobile terminal, the matching with a map according to an azimuth of the target device relative to the mobile terminal at the current measurement moment and the effective motion trail of the target device, to determine a location of the target device, the method includes obtaining, by the mobile terminal, strength of a received signal sent by the target device at the current measurement moment, and determining a distance from the target device to the mobile terminal at the current measurement moment according to the strength of the signal and a preconfigured communication distance mapping table; and performing, by the mobile terminal, matching with a map according to an azimuth of the target device relative to the mobile terminal at the current measurement moment and the effective motion trail of the target device, to determine a location of the target device includes: performing, by the mobile terminal, matching with the map according to the azimuth of the target device relative to the mobile terminal at the current measurement moment, the effective motion trail of the target device, and the distance from the target device to the mobile terminal at the current measurement moment, to determine the location of the target device.

With reference to the first aspect of the disclosure, in a sixth possible implementation manner of the first aspect of the disclosure, the mobile terminal communicates with the target device in a short range communications manner.

A second aspect of the disclosure provides a mobile terminal, including an azimuth measurement module configured to obtain measurement signals sent by a target device from a trigger moment to a current measurement moment, and determine azimuths of the target device relative to the mobile terminal at the moments according to the measurement signals; an obtaining module configured to obtain an original motion trail of the target device from the trigger moment to the current measurement moment; an effective motion trail determining module configured to determine an effective motion trail of the target device according to the original motion trail and change rates of the azimuths of the target device relative to the mobile terminal at the moments; a location determining module configured to perform matching with a map according to an azimuth of the target device relative to the mobile terminal at the current measurement moment and the effective motion trail of the target device, to determine location information of the target device at the current measurement moment; and a display module configured to display the location information of the target device at the current measurement moment.

With reference to the second aspect of the disclosure, in a first possible implementation manner of the second aspect of the disclosure, the obtaining module is configured to receive motion data of the target device from the trigger moment to the current measurement moment, and generate the original motion trail according to the motion data of the target device from the trigger moment to the current measurement moment.

With reference to the second aspect of the disclosure, in a second possible implementation manner of the second aspect of the disclosure, the obtaining module is configured to receive the original motion trail sent by the target device, where the original motion trail is generated by the target device according to motion data that is of the target device from the trigger moment to the current measurement moment and obtained by means of measurement.

With reference to the first possible implementation manner of the second aspect of the disclosure, in a third possible implementation manner of the second aspect of the disclosure, the mobile terminal further includes a determining module configured to: determine whether a motion status of the target device at the trigger moment is the same as a motion status of the mobile terminal at the trigger moment according to the motion data of the target device at the trigger moment and motion data of the mobile terminal at the trigger moment; and determine to position the target device if the motion status of the target device at the trigger moment is different from the motion status of the mobile terminal at the trigger moment.

With reference to the second aspect of the disclosure, in a fourth possible implementation manner of the second aspect of the disclosure, the mobile terminal further includes a determining module configured to: determine whether strength of a signal that is sent by the target device at the trigger moment and received by the mobile terminal is less than a preset received signal strength threshold; and determine to position the target device if the strength of the signal is less than the preset received signal strength threshold.

With reference to the second aspect of the present disclosure and the first to fourth possible implementation manners of the first aspect, in a fifth possible implementation manner of the second aspect of the disclosure, the mobile terminal further includes a distance determining module configured to obtain strength of a signal that is sent by the target device at the current measurement moment and received by the mobile terminal, and determine a distance from the target device to the mobile terminal at the current measurement moment according to the strength of the signal and a preconfigured communication distance mapping table. A location determining module is configured to perform matching with the map according to the azimuth of the target device relative to the mobile terminal at the current measurement moment, the effective motion trail of the target device, and the distance from the target device to the mobile terminal at the current measurement moment to determine a location of the target device.

With reference to the second aspect of the disclosure, in a sixth possible implementation manner of the second aspect of the disclosure, the mobile terminal communicates with the target device in a short range communications manner.

A third aspect of the disclosure provides a mobile terminal, including a processor, a memory, and a display, where the memory and the display are connected to the processor and implement mutual communication by using a system bus. The memory is configured to store a computer executable instruction. The processor is configured to run the computer executable instruction so that the mobile terminal executes the following operations: obtaining measurement signals sent by a target device from a trigger moment to a current measurement moment, determining azimuths of the target device relative to the mobile terminal at the moments according to the measurement signals; obtaining an original motion trail of the target device from the trigger moment to the current measurement moment; determining an effective motion trail of the target device according to the original motion trail and change rates of the azimuths of the target device relative to the mobile terminal at the moments; and performing matching with a map according to an azimuth of the target device relative to the mobile terminal at the current measurement moment and the effective motion trail of the target device, to determine location information of the target device at the current measurement moment. A display is configured to display the location information of the target device at the current measurement moment.

With reference to the third aspect of the disclosure, in a first possible implementation manner of the third aspect of the disclosure, the processor is configured to receive motion data of the target device from the trigger moment to the current measurement moment, and generate the original motion trail according to the motion data of the target device from the trigger moment to the current measurement moment.

With reference to the third aspect of the disclosure, in a second possible implementation manner of the third aspect of the disclosure, the processor is configured to receive the original motion trail sent by the target device, where the original motion trail is generated by the target device according to motion data that is of the target device from the trigger moment to the current measurement moment and obtained by means of measurement.

With reference to the first possible implementation manner of the third aspect of the disclosure, in a third possible implementation manner of the third aspect of the disclosure, the processor is further configured to determine whether a motion status of the target device at the trigger moment is the same as a motion status of the mobile terminal at the trigger moment according to the motion data of the target device at the trigger moment and motion data of the mobile terminal at the trigger moment; and determine to position the target device if the motion status of the target device at the trigger moment is different from the motion status of the mobile terminal at the trigger moment.

With reference to the third aspect of the disclosure, in a fourth possible implementation manner of the third aspect of the disclosure, the processor is further configured to determine whether strength of a signal that is sent by the target device at the trigger moment and received by the mobile terminal is less than a preset received signal strength threshold; and determine to position the target device if the strength of the signal is less than the preset received signal strength threshold.

With reference to the third aspect of the disclosure and the first to fourth possible implementation manners of the third aspect, in a fifth possible implementation manner of the third aspect of the disclosure, the processor is further configured to obtain strength of a signal that is sent by the target device at the current measurement moment and received by the mobile terminal, and determine a distance from the target device to the mobile terminal at the current measurement moment according to the strength of the signal and a preconfigured communication distance mapping table; and perform matching with the map according to the azimuth of the target device relative to the mobile terminal at the current measurement moment, the effective motion trail of the target device, and the distance from the target device to the mobile terminal at the current measurement moment, to determine a location of the target device.

With reference to the third aspect of the disclosure, in a sixth possible implementation manner of the third aspect of the disclosure, the mobile terminal communicates with the target device in a short range communications manner.

According to the target device positioning method and the mobile terminal provided in the embodiments of the disclosure, a mobile terminal determines, according to obtained measurement signals sent by a target device from a trigger moment to a current measurement moment, azimuths of the target device relative to the mobile terminal at moments; obtains an original motion trail of the target device from the trigger moment to the current measurement moment; determines an effective motion trail of the target device according to the original motion trail and change rates of the azimuths of the target device relative to the mobile terminal at the moments; performs matching with a map according to an azimuth of the target device relative to the mobile terminal at the current measurement moment and the effective motion trail of the target device, to determine location information of the target device at the current measurement moment; and displays the location information of the target device at the current measurement moment. According to the foregoing method, a location of the target device can be accurately determined by using the azimuths of the target device and the effective motion trail, so that a user can quickly and accurately find the target device.

BRIEF DESCRIPTION OF DRAWINGS

To describe the technical solutions in the embodiments of the disclosure or in the prior art more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
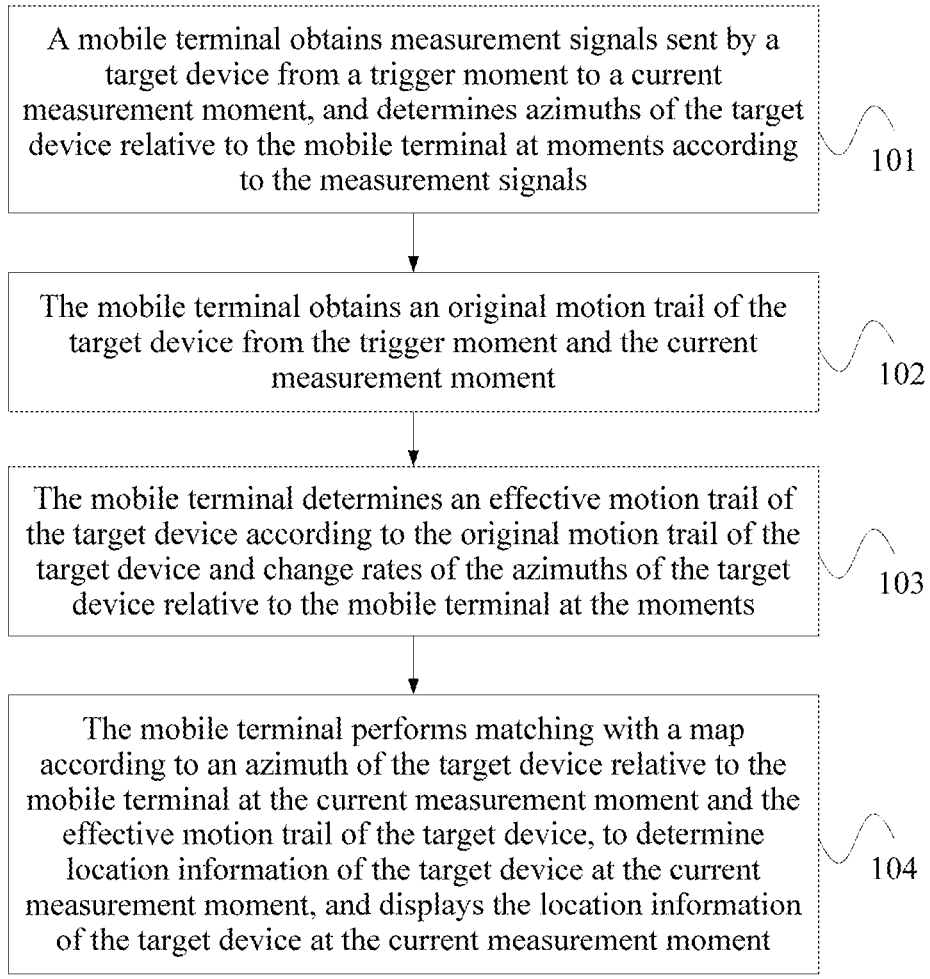
FIG. 1 is a flowchart of a target device positioning method according to a first embodiment of the disclosure.

To make the objectives, technical solutions, and advantages of the embodiments of the disclosure clearer, the following clearly and completely describes the technical solutions in the embodiments of the disclosure with reference to the accompanying drawings in the embodiments of the disclosure. Apparently, the described embodiments are some but not all of the embodiments of the disclosure. All other embodiments obtained by a person of ordinary skill in the art based on the embodiments of the disclosure without creative efforts shall fall within the protection scope of the disclosure.

Positioning a target device in a short range communications manner is widely applied to application scenarios. For example, a mobile phone, a wallet, and a key are generally main objects in anti-lost application scenarios. A target device having a short range communications function may be carried on the wallet or the key, and the mobile phone establishes short range communication with the target device. When the wallet or the key is lost, the mobile phone may determine a distance between the target device and the mobile phone according to strength of a received signal of the target device. When the strength of the signal, received by the mobile phone, of the target device is relatively low, it is determined that the target device is moving away from the mobile phone, and the target device or the mobile phone may be lost. In this case, the mobile phone prompts a user in a manner such as a sound, vibration, or a light signal. At the same time, the mobile phone instructs the target device to prompt the user, and the target device may prompt the user in a manner such as a sound, vibration, or a light signal. In this way, regardless of loss of the mobile phone or a target, the user can find, in a timely manner, that the mobile phone or the target is lost. Another commonly used application scenario is a child anti-lost scenario in which a child wears a target device on the body, and when the child is moving away from a parent's sight, the parent can find, in a timely manner, that the child is moving away from the parent's sight.

According to the solutions in the prior art, a mobile terminal can only find that a target device is moving away from a user, but cannot determine a specific location of the target device. According to a target device positioning method provided in the embodiments of the disclosure, a specific location of a target device can be determined. A positioning system to which the embodiments of the disclosure are applicable includes a mobile terminal, a multi-antenna array apparatus, and a target device. The mobile terminal is an electronic device having a short range communications function, a commonly used short range communications manner includes a BLE technology and a WI-FI technology. The mobile terminal is, for example, a device having a BLE or WI-FI function, such as a smartphone, a tablet computer, and a personal digital assistant (PDA). The target device is a device having a short range communications function, the target device is generally a wearable device, and can be conveniently worn on an anti-lost object, and the target device is, for example, a device such as an anti-lost label, a child wristband, or a child wrist watch. The target device is configured to establish a BLE or WI-FI connection to the mobile device, and perform short range communication. When the target device is moving away from the mobile terminal, the target device or the mobile device prompts, by using a sound signal and the like, a user that the target device is moving away from the user, so that the user can find, in a timely manner, and look for the anti-lost object wearing the target device. In the solutions of the disclosure, the multi-antenna array apparatus is added to enable the user to quickly and accurately find the target device. The multi-antenna array apparatus is configured to measure an azimuth of the target device relative to the mobile terminal. The azimuth of the target object relative to the mobile terminal is measured, which can help the user quickly and accurately find the target device.

The multi-antenna array apparatus may be disposed inside the mobile terminal, or the multi-antenna array apparatus may be independently used as a device and be disposed outside the mobile terminal. In the prior art, multi-antenna array apparatuses are built in some mobile terminals, then no multi-antenna array apparatus needs to be added inside the mobile terminal, and the multi-antenna array apparatus built in the mobile terminal is directly used. When there is no multi-antenna array apparatus inside the mobile terminal, a multi-antenna array apparatus may be added inside the mobile terminal, or a multi-antenna array apparatus may be disposed outside the mobile terminal without changing an existing structure of the mobile terminal.

FIG. 1 is a flowchart of a target device positioning method according to a first embodiment of the disclosure. As shown in FIG. 1, the method in this embodiment may include the following steps:

Step 101: A mobile terminal obtains measurement signals sent by a target device from a trigger moment to a current measurement moment, and determines azimuths of the target device relative to the mobile terminal at moments according to the measurement signals.

The mobile terminal receives, by using a built-in multi-antenna array apparatus, the measurement signals sent by the target device at the moments, or the mobile terminal receives, by using an external multi-antenna array apparatus, the measurement signals sent by the target device at the moments, and the mobile terminal calculates the azimuths of the target device relative to the mobile terminal at the moments according to the measurement signals that are sent by the target device at the moments and received by the multi-antenna array apparatus. When the target device is connected to the mobile terminal by using a BLUETOOTH technology or a BLE technology, the measurement signal may be a broadcast signal sent by the target device over a BLUETOOTH broadcast channel, or the measurement signal is a data signal sent by the target device over a Bluetooth connection. It may be understood that before receiving the measurement signal, the mobile terminal needs to establish a short range communications connection to the target device, where the connection is a BLUETOOTH connection or a WI-FI connection.

Figure 2:
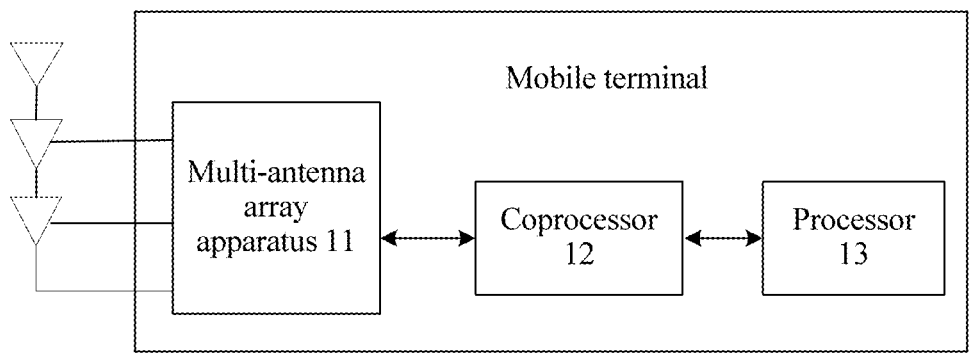
FIG. 2 is a schematic structural diagram of a mobile terminal.

FIG. 2 is a schematic structural diagram of a mobile terminal. As shown in FIG. 2, the mobile terminal includes a multi-antenna array apparatus 11, a coprocessor 12, and a processor 13. The multi-antenna array apparatus 11 is connected to the coprocessor 12. The multi-antenna array apparatus 11 includes multiple receive antennas, and each receive antenna of the multi-antenna array apparatus 11 can receive the measurement signal. The multi-antenna array apparatus 11 determines a phase difference of the measurement signal according to the measurement signal received by each antenna array, and sends the phase difference of the measurement signal to the coprocessor 12, and the coprocessor 12 determines an azimuth of the target device relative to the mobile terminal at the measurement moment according to the phase difference of the measurement signal.

Figure 3:
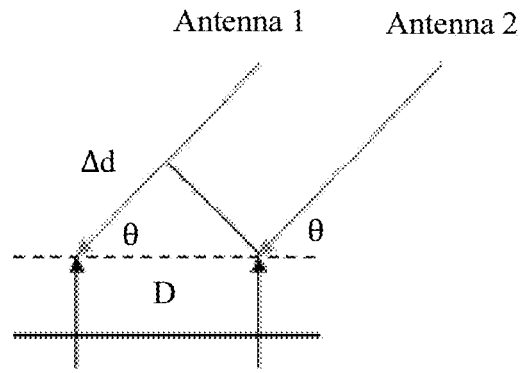
FIG. 3 is a schematic structural diagram of a multi-antenna array.

In this embodiment, when the multi-antenna array apparatus 11 includes two receive antennas, the azimuth measured by the multi-antenna array apparatus 11 is an azimuth in two-dimensional space, for example, the azimuth measured by the multi-antenna array apparatus 11 is an azimuth in a horizontal direction. When a quantity of receive antennas included in the multi-antenna array apparatus 11 is greater than or equal to 3, the azimuth measured by the multi-antenna array apparatus 11 is an azimuth in three-dimensional space. For example, the multi-antenna array apparatus 11 includes three receive antennas, the three antennas are arranged at a right angle, the antenna 1 is located at an origin of a rectangular coordinate system, the antenna 2 is located at an X axis, the antenna 3 is located at a Y axis, a distance from the antenna 2 to the antenna 1 and a distance from the antenna 3 to the antenna 1 are D, and an azimuth of the target device relative to the mobile terminal is defined as follows: The azimuth includes angles between a line from the multi-antenna array origin to the target device and positive directions of the X, Y, and Z coordinate axes, that is, ($\alpha$, $\beta$, $\gamma$), where value ranges of $\alpha$ and $\beta$ are greater than or equal to 0 and are less than or equal to π, and a value range of γ is greater than or equal to 0 and is less than or equal to π/2. As shown in FIG. 3, FIG. 3 is a schematic structural diagram of a multi-antenna array. It is assumed that a phase difference between an antenna 2 and an antenna 1 is Δd, a wavelength of a measurement signal is γ, and a distance between the antenna 2 and the antenna 1 is D; then α=arc cos(Δd/2πD), and likewise, β and γ may be obtained. In the prior art of measuring an azimuth by using a multi-antenna array, any one of conventional methods may be used for measurement, and details are not further described herein.

The coprocessor 12 may send the phase difference of the measurement signal to the processor 13, and the processor 13 determines the azimuth of the target device relative to the mobile terminal at the measurement moment according to the phase difference of the measurement signal. The processor 13 is configured to process all data of the mobile terminal, and the coprocessor 12 is configured to share a part of processing tasks of the processor 13.

Figure 4:
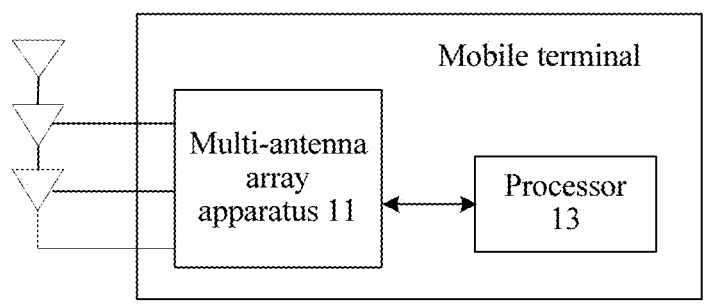
FIG. 4 is another schematic structural diagram of a mobile terminal.

FIG. 4 is another schematic structural diagram of a mobile terminal. As shown in FIG. 4, compared with the mobile terminal shown in FIG. 2, the mobile terminal shown in FIG. 4 does not include a coprocessor, a multi-antenna array apparatus 11 is directly connected to and communicates with a processor 13, the multi-antenna array apparatus 11 receives a measurement signal, determines a phase difference of the measurement signal, and sends the phase difference of the measurement signal to the processor 13, and the processor 13 determines an azimuth of the target device relative to the mobile terminal at the measurement moment according to the phase difference of the measurement signal.

For the mobile terminals shown in FIG. 2 and FIG. 4, the multi-antenna array apparatus 11 is disposed inside the mobile terminals. The multi-antenna array apparatus 11 is used as a Bluetooth receive antenna and is configured to receive data sent by the target device. In this embodiment, the multi-antenna array apparatus 11 is not only used as a Bluetooth receive antenna, but also can receive and measure a measurement signal sent by the target device.

Figure 5:
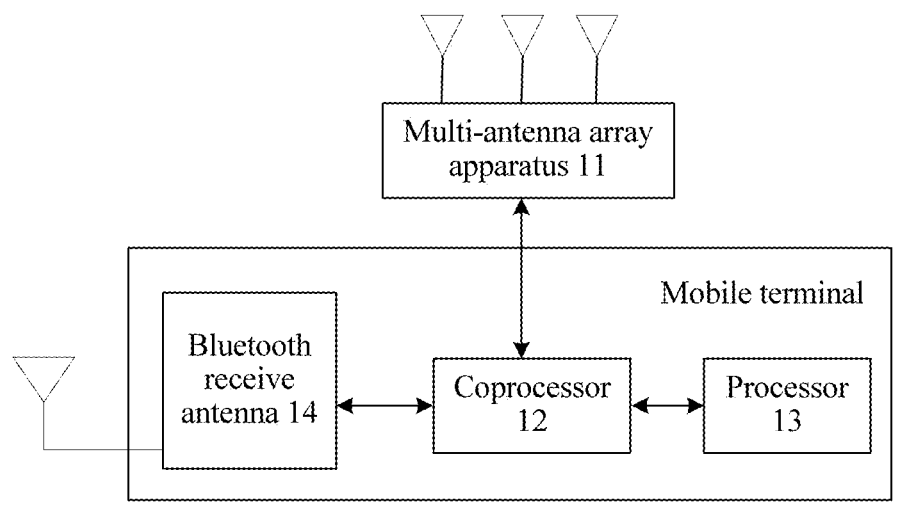
FIG. 5 is still another schematic structural diagram of a mobile terminal.

FIG. 5 is still another schematic structural diagram of a mobile terminal. As shown in FIG. 5, the mobile terminal includes a multi-antenna array apparatus 11, a coprocessor 12, a processor 13, and a Bluetooth receive antenna 14, where the antenna array apparatus 11 is connected to the coprocessor 12, the coprocessor 12 is connected to the processor 13, and the coprocessor 12 is further connected to the Bluetooth receive antenna 14. A difference of the mobile terminal shown in FIG. 4 from the mobile terminal shown in FIG. 2 lies in that the Bluetooth receive antenna 14 is a single antenna. The single antenna cannot be used to measure an azimuth, and only a multi-antenna array can be used to measure an azimuth. Therefore, the multi-antenna array apparatus 11 is disposed outside the mobile terminal. The multi-antenna array apparatus 11 is configured to receive a measurement signal sent by the target device, determine a phase difference of the measurement signal, and send the phase difference of the measurement signal to the coprocessor 12. The coprocessor 12 determines an azimuth of the target device relative to the mobile terminal at the measurement moment according to the phase difference of the measurement signal.

Figure 6:
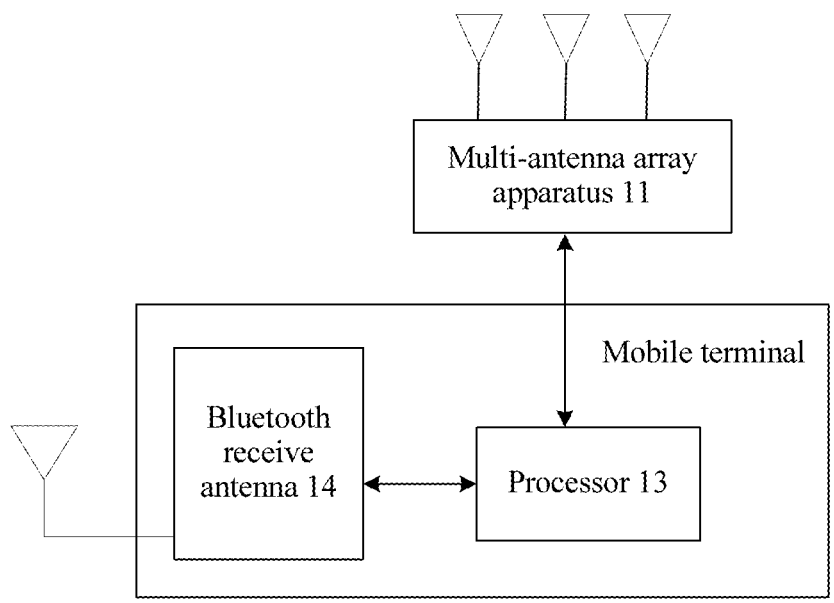
FIG. 6 is yet another schematic structural diagram of a mobile terminal.

FIG. 6 is yet another schematic structural diagram of a mobile terminal. As shown in FIG. 6, a difference between the mobile terminal shown in FIG. 6 and the mobile terminal shown in FIG. 5 lies in that the mobile terminal shown in FIG. 6 does not include a coprocessor, and a multi-antenna array apparatus 11 and a Bluetooth receive antenna 14 are directly connected to and communicate with a processor 13.

Figure 7:
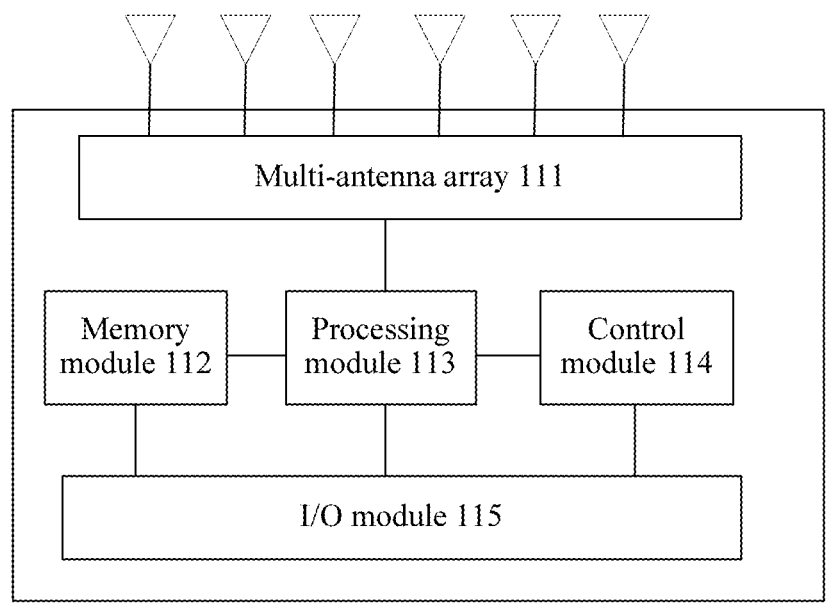
FIG. 7 is a schematic structural diagram of a multi-antenna array apparatus.

FIG. 7 is a schematic structural diagram of a multi-antenna array apparatus. As shown in FIG. 7, a multi-antenna array apparatus 11 includes a multi-antenna array 111, a memory module 112, a processing module 113, a control module 114, and an input/output (I/O) module 115. The multi-antenna array 111 includes multiple receive antennas configured to receive a measurement signal sent by the target device. The memory module 112 is configured to cache measurement signals received by receive antennas and store a computer executable program. The processing module 113 is configured to process the measurement signals to obtain a phase difference of the measurement signals. The control module 114 is configured to control communication between modules. The I/O module 115 communicates with the mobile terminal, where the I/O module 115 may be a Universal Serial Bus (USB) interface or an audio interface. The multi-antenna array apparatus 11 may further include a battery module configured to supply power to the multi-antenna array apparatus 11.

In this embodiment, azimuths that are of the target device relative to the mobile terminal at moments and obtained through calculation by the mobile terminal is independent of a posture of the mobile terminal, that is, the posture of the mobile terminal used by a user does not affect measurement and display of the azimuth. The azimuth may be an absolute angle relative to a geodetic coordinate system, or may be a relative angle relative to a mobile terminal coordinate system. When the azimuth is the absolute angle relative to the geodetic coordinate system, two coordinate system transformations need to be performed on the absolute angle relative to the geodetic coordinate system. One transformation is a transformation of the azimuth relative to a mobile phone coordinate system, and the other transformation is a transformation of the mobile phone coordinate system relative to the geodetic coordinate system. The multi-antenna array apparatus may collect a plane angle and a pitch angle of a measurement signal broadcast by the target device, the mobile terminal may determine an azimuth of the target device relative to the mobile terminal coordinate system by using an accelerometer or a gyroscope on the mobile terminal, and then may determine an absolute azimuth of the target device relative to the geodetic coordinate system by using a magnetometer (for example, a compass).

Specific directions of a target object at the moments may be determined by using the step. For example, at the current measurement moment, the target object is in a north direction, or in an orientation of 40 degrees south of east.

Step 102: The mobile terminal obtains an original motion trail of the target device from the trigger moment and the current measurement moment.

The mobile terminal may obtain the original motion trail of the target device from the trigger moment to the current measurement moment in the following two manners:

Manner 1: The mobile terminal receives motion data of the target device from the trigger moment to the current measurement moment, and generates the original motion trail according to the motion data of the target device from the trigger moment to the current measurement moment.

Manner 2: The mobile terminal receives the original motion trail sent by the target device, where the original motion trail is generated by the target device according to motion data that is of the target device from the trigger moment to the current measurement moment and obtained by means of measurement.

In manner 1, the target device collects motion data of the target device at each collection moment and reports the motion data to the mobile terminal, and the mobile terminal generates a motion trail of the target device according to the motion data reported by the target device. The mobile terminal or the target device may generate the motion trail according to motion data at the moments in any one of existing manners, and details are not described herein.

Figure 8:
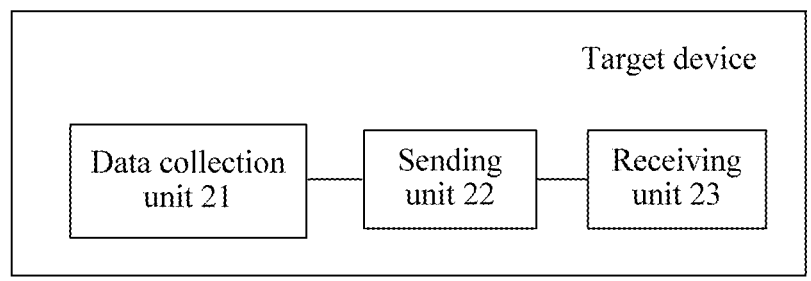
FIG. 8 is a schematic structural diagram of a target device.

Referring to FIG. 8, FIG. 8 is a schematic structural diagram of a target device, and the target device includes a data collection unit 21, a sending unit 22, and a receiving unit 23. The data collection unit 21 is configured to collect motion data of the target device at each collection moment. The sending unit 22 is configured to send, to the mobile terminal, the motion data collected by the data collection unit 21, and the sending unit 22 is further configured to send a measurement signal to a multi-antenna array apparatus. The receiving unit 23 is configured to receive a message instruction sent by the mobile terminal, for example, receive a prompt instruction sent by the mobile terminal, and prompt, according to the prompt instruction and in a manner of vibration, a sound, or a light signal, a user that the target device is moving away from the user. The data collection unit 21 includes a sensor, the data collection unit 21 collects the motion data of the target device by using the sensor, the target device is generally carried on an anti-lost object, the target device moves together with the anti-lost object, and the motion data of the target device is also motion data of the anti-lost object. The sensor is an accelerometer, a gyroscope, a magnetometer, or the like, and the motion data is data such as velocity vector components of the accelerometer on three axes in space or angular velocity vector components of the gyroscope on three axes in space. The target device collects the motion data of the anti-lost object at each collection moment, then reports the motion data to the mobile terminal, and the mobile terminal detects strength of a received signal of the motion data, where the strength of the received signal of the motion data is a power value of the received signal. Optionally, the target device may further include a processing module configured to generate an original motion trail of the target device according to the motion data collected by the data collection unit 21, and send the original motion trail to the mobile terminal by using the sending unit 22.

Figure 9:
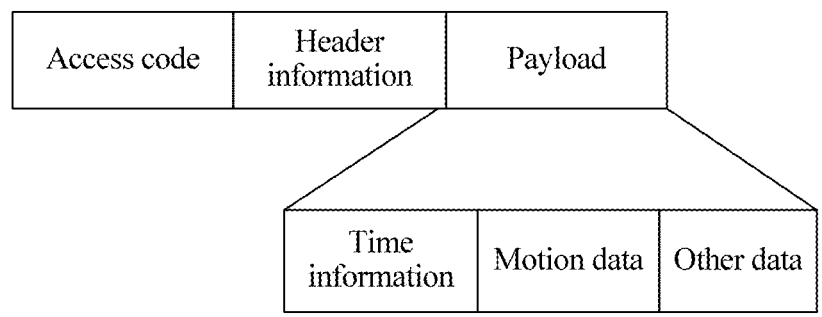
FIG. 9 shows a Bluetooth® data frame format.

When the mobile terminal establishes a Bluetooth connection to the target device, the mobile terminal and the target device communicate with each other by using a Bluetooth protocol. The motion data or the original motion trail sent by the target device to the mobile terminal may use a frame format shown in FIG. 9. FIG. 9 shows a BLUETOOTH data frame format. As shown in FIG. 9, the data frame includes three fields: an access code, header information, and payload. The access code includes data synchronization information, a data packet identifier, and the like, the header information includes link control information, and the payload carries the motion data of the target device, time information at a collection moment corresponding to the motion data, and other data, or the payload carries the original motion trail of the target device and a start moment and an end moment of the original motion trail.

Step 103: The mobile terminal determines an effective motion trail of the target device according to the original motion trail of the target device and change rates of the azimuths of the target device relative to the mobile terminal at the moments.

After obtaining the azimuths of the target device from the trigger moment to the current measurement moment and the original motion trail, the mobile terminal further determines the effective motion trail of the target device from the trigger moment to the measurement moment according to the change rates of the azimuths at the moments.

Figure 10:
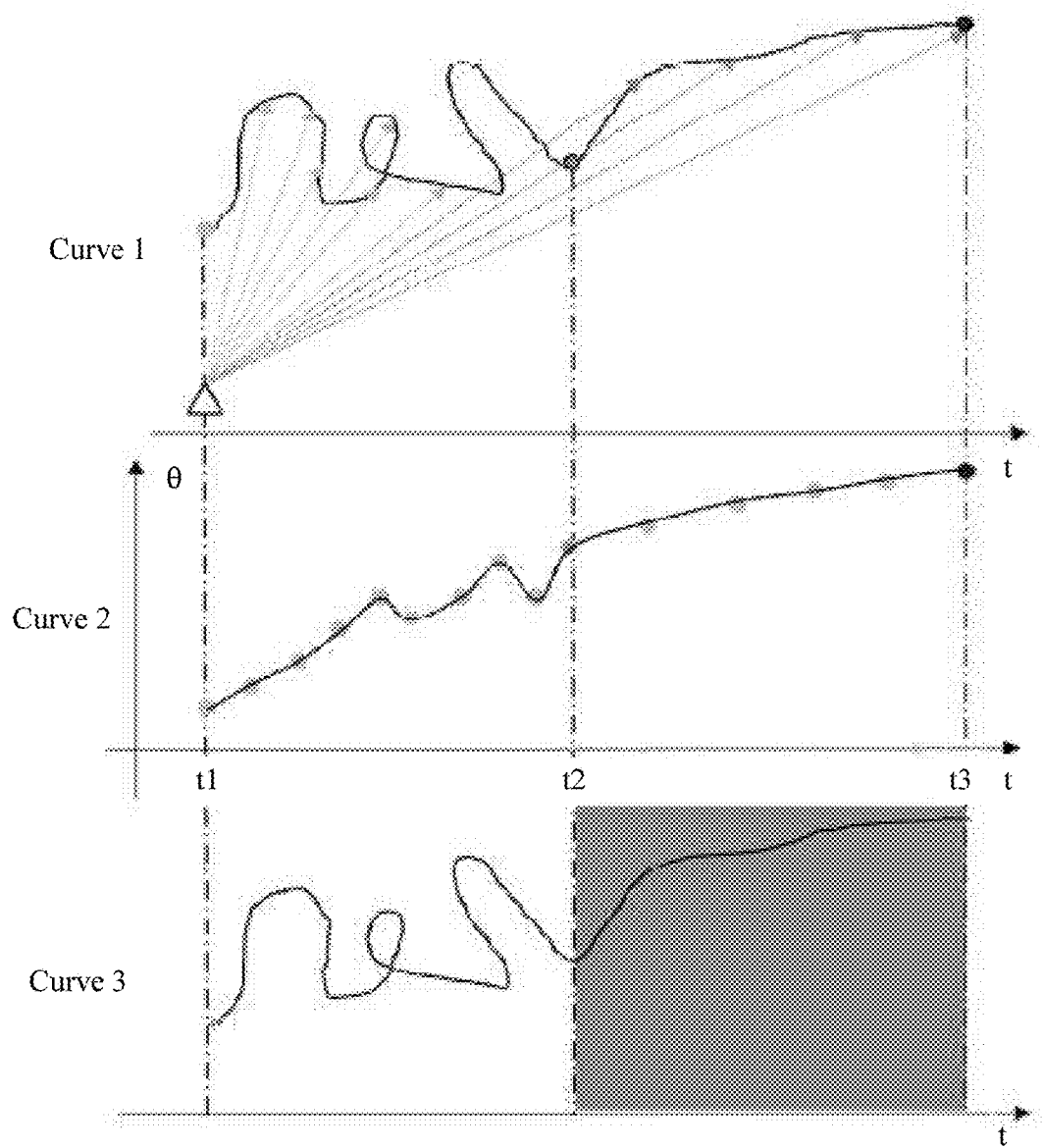
FIG. 10 is a schematic diagram of determining an effective motion trail of a target device.

FIG. 10 is a schematic diagram of determining an effective motion trail of a target device. As shown in FIG. 10, a curve 1 is an original motion trail of the target device. A moment t1 is a trigger moment, and the mobile terminal starts to record a motion trail of the target device at the moment t1. A moment t3 is a current collection moment. Multiple collection moments are included between the moment t1 and the moment t3. It may be learned, from the curve 1, that the original motion trail of the target device is irregular from the moment t1 to a moment t2, and the original motion trail of the target device is relatively regular from the moment t2 to the moment t3. Therefore, the mobile device may use the corresponding original motion trail of the target device from the moment t2 to the moment t3 as an effective motion trail of the target device.

The mobile terminal may determine the effective motion trail of the target device according to the change rate of the azimuth of the target device. A curve 2 in FIG. 10 is a changing curve of the azimuth of the target device drawn by the mobile terminal. In the curve 2, a horizontal axis is time, and a vertical axis represents the azimuth of the target device. The mobile terminal may determine the change rate of the azimuth of the target device in the following manner: The mobile terminal obtains azimuths $\theta_{t1+1}$ and $\theta_{t1+2}$ moments at two collection moments after the moment t1, where $\theta_{t1+1}$ is an azimuth at a moment t1+1, $\theta_{t1+2}$ is an azimuth at a moment t1+2, and an azimuth at the moment t1 is $\theta_{t1}$; and determines a difference value between the azimuth at the moment t1+1 and the azimuth at the moment t1 and a difference value between the azimuth at the moment t1+2 and the azimuth at the moment t1 by using a difference algorithm. If the difference value of the azimuth at the moment t1+1 is less than the difference value of the azimuth at the moment t1+2, that is, $|\theta_{t1+1}-\theta_{t1}|<|\theta_{t1+2}-\theta_{t1}|$, it indicates that a change of the azimuth is continuously increasing. If the difference value of the azimuth at the moment t1+1 is greater than or equal to the difference value of the azimuth at the moment t1+2, that is, $|\theta_{t1+1}-\theta_{t1}|\|\theta_{t1+2}-\theta_{t1}|$, it indicates that a change of the azimuth is decreasing. Likewise, a change rate of an azimuth at each moment is successively calculated according to the foregoing method. The curve 2 is used as an example, the change of the azimuth no longer jumps after the moment t2. Therefore, a moving curve after the moment t2 is used as an effective motion trail. A high-frequency noise signal from the moment t1 to the moment t2 may be filtered and a relatively smooth azimuth signal from the moment t2 to a moment t3 may be retained by using low-pass filtering.

Both the motion trail and the azimuth of the target device are continuous signals in a same time domain, the change of the azimuth is strongly correlated to the motion trail of the target device, and a motion trail corresponding to an azimuth that changes in a jumping manner is also irregular. A curve of a gray part in a curve 3 in FIG. 10 is the effective motion trail of the target device.

Step 104: The mobile terminal performs matching with a map according to an azimuth of the target device relative to the mobile terminal at the current measurement moment and the effective motion trail of the target device, to determine location information of the target device at the current measurement moment, and displays the location information of the target device at the current measurement moment.

In this embodiment, when the location information of the target device at the current measurement moment are being determined, matching with the map is performed according to the azimuth of the target device relative to the mobile terminal at the current measurement moment and the effective motion trail of the target device, and therefore a specific location of the target device can be precisely determined. For example, an indoor map of an indoor environment in which a user is located is saved in a mobile terminal. A location of the user in the indoor environment at a current measurement moment may be determined by using an existing indoor positioning technology, where the location of the user is a location of the mobile terminal. The mobile terminal matches the location of the user, an azimuth of a target device relative to the mobile terminal, an effective motion trail of the target device, and a distance from the target device to the mobile terminal with an indoor plane map to obtain location information of the target device at the measurement moment.

The location information of the target device at the current measurement moment includes a motion path of the target device on the map from the trigger moment to the current measurement moment and the specific location of the target device at the current measurement moment. The mobile terminal displays, on the map, the location of the target device at the current measurement moment and the motion path of the target device on the map from the trigger moment to the current measurement moment, and provides accurate location information to the user, so that the user can quickly and accurately find the target device according to the location information. For example, in a crowded public place, a child of a user is lost, the child wears a target device on the body, and the user may look for the child along a motion path of the child by using a motion path that is displayed on the mobile terminal before the target device is disconnected.

It may be understood that in this embodiment, step 101 and step 102 have no sequence when being performed, and may be performed concurrently, that is, the determining azimuths of the target device relative to the mobile terminal and the obtaining an original motion trail of the target device may be performed at the same time, and have no sequence.

After determining the location information of the target device, the mobile terminal displays the location information of the target device to the user, so that the user can accurately find the target device according to the location information of the target device. In this embodiment, when the mobile terminal detects that a distance from the target device to the mobile terminal at the measurement moment exceeds a distance threshold, or that the target device is disconnected from the mobile terminal, the mobile terminal may prompt, in a manner of a sound, vibration, or a light signal, the user that the target device is moving away from the user, and the user can quickly and accurately find a target object according to a location of the target device displayed by the mobile device. The mobile terminal may also instruct at the same time the target device to prompt the user.

In this embodiment, a mobile terminal determines, according to obtained measurement signals sent by a target device from a trigger moment to a current measurement moment, azimuths of the target device relative to the mobile terminal at moments; obtains an original motion trail of the target device from the trigger moment to the current measurement moment; determines an effective motion trail of the target device according to the original motion trail and change rates of the azimuths of the target device relative to the mobile terminal at the moments; performs matching with a map according to an azimuth of the target device relative to the mobile terminal at the current measurement moment and the effective motion trail of the target device, to determine location information of the target device at the current measurement moment; and displays the location information of the target device at the current measurement moment.

According to the method in this embodiment, a location of the target device can be accurately determined by using the azimuth and the effective motion trail of the target device, so that a user can quickly and accurately find the target device.

Figure 11:
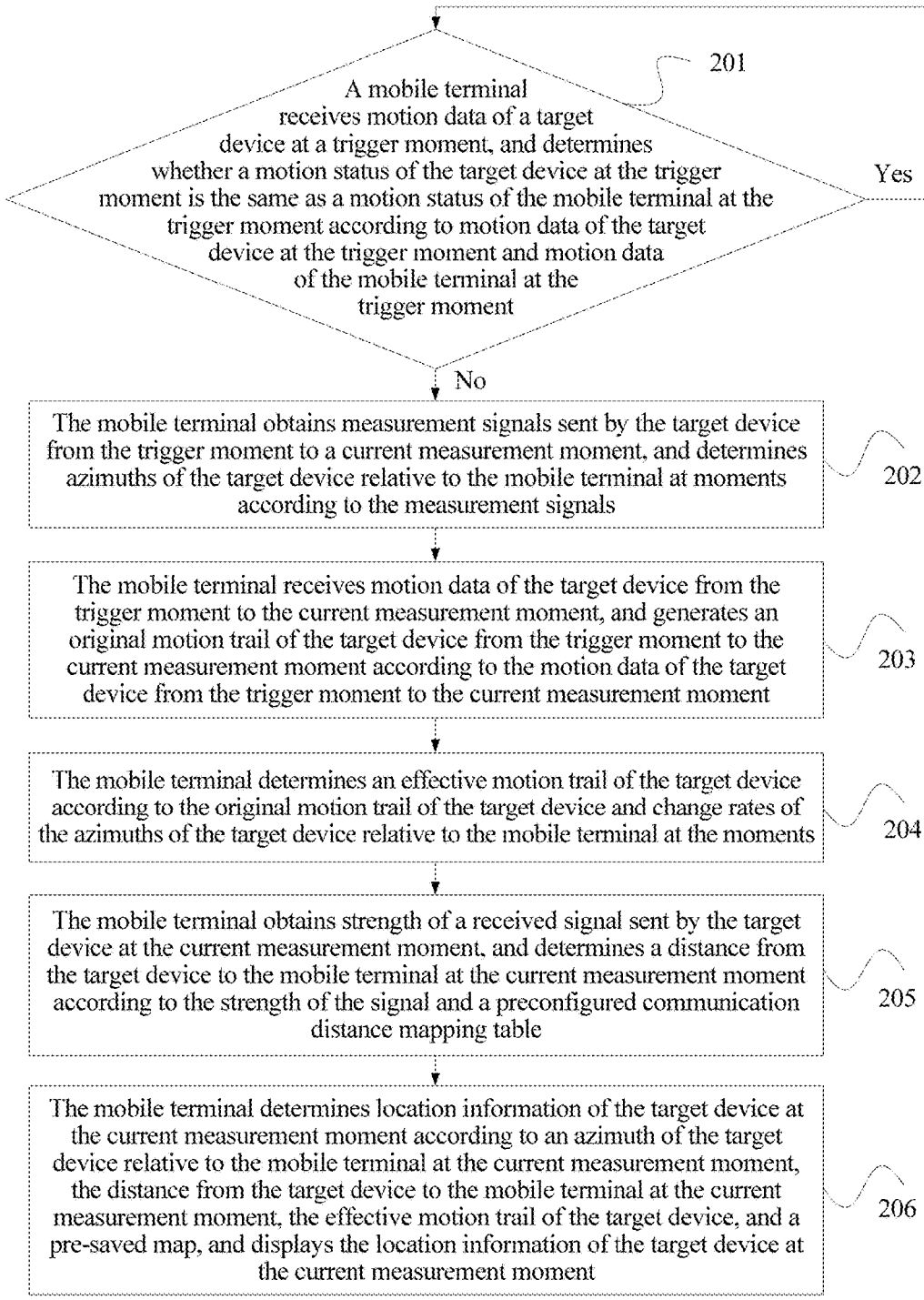
FIG. 11 is a flowchart of a target device positioning method according to a second embodiment of the disclosure.

FIG. 11 is a flowchart of a target device positioning method according to a second embodiment of the disclosure. As shown in FIG. 11, the method in this embodiment may include the following steps:

Step 201: A mobile terminal receives motion data of a target device at a trigger moment, and determines whether a motion status of the target device at the trigger moment is the same as a motion status of the mobile terminal at the trigger moment according to the motion data of the target device at the trigger moment and motion data of the mobile terminal at the trigger moment.

The mobile terminal also includes a sensor configured to measure motion data of the mobile terminal, where the sensor may be an accelerometer, a gyroscope, a magnetometer, or the like. The mobile terminal is generally carried on the body of a user, and moves together with the user, and the motion data of the mobile terminal is motion data of the user. The motion data is velocity vector components of the accelerometer on three axes in space or angular velocity vector components of the gyroscope on three axes in space. The mobile terminal may obtain motion status parameters such as a moving velocity and a moving direction of the mobile terminal according to the motion data of the mobile terminal, and may obtain motion status parameters such as a moving velocity and a moving direction of the target device according to motion data reported by the target device.

The target device collects motion data of the target device at each measurement moment and reports the motion data to the mobile terminal, and the mobile terminal determines whether a motion status of the target device is the same as a motion status of the mobile terminal according to motion data of the target device and motion data of the mobile terminal at a same measurement moment. If a motion status of the mobile terminal is different from a motion status of the target device at a particular measurement moment, the measurement moment is referred to as a trigger moment. If from the trigger moment on, the motion status of the mobile terminal is different from the motion status of the target device, the mobile terminal determines to position the target device, and the mobile terminal cyclically performs steps 202 to 206, that is, the mobile terminal receives, at the trigger moment and at each measurement moment following the trigger moment, a measurement signal sent by the target device, measures an azimuth of the target device relative to the mobile terminal, and generates a motion trail of the target device according to the target device. If the motion status of the target device is the same as the motion status of the mobile terminal, the mobile terminal determines not to position the target device, and the mobile terminal repeatedly performs step 201 at a next measurement moment.

Because of a difference between the sensor of the mobile terminal and a sensor of the target device, and of some other external factors, in a case in which the motion status of the mobile terminal is the same as the motion status of the target device, motion data collected by the mobile terminal and motion data collected by the target device cannot be identical. Therefore, a motion status parameter of the mobile terminal and a motion status parameter of the target device that are obtained cannot be identical. In this embodiment, that the motion status of the mobile terminal is the same as the motion status of the target device does not mean that the motion status parameters of the two are identical. It is considered that the motion statuses of the two are the same, provided that the motion status parameters of the two fall within a particular allowed error range. That the motion status of the mobile terminal is the same as the motion status of the target device indicates that the user carries the target device, the target device is not moving away from the user, and the mobile terminal does not need to position the target device. If the motion status of the mobile terminal is different from the motion status of the target device, it indicates that the target device is moving away from the user, the target device may be lost or stolen, and the mobile terminal needs to position the target device.

In this embodiment, alternatively, whether the motion data of the mobile terminal is the same as the motion data of the target device may be directly compared. If the motion data of the mobile terminal is different from the motion data of the target device, the mobile terminal determines to position the target device. If the motion data of the mobile terminal is the same as the motion data of the target device, the mobile terminal determines not to position the target device.

Step 202: The mobile terminal obtains measurement signals sent by the target device from the trigger moment to a current measurement moment, and determines azimuths of the target device relative to the mobile terminal at moments according to the measurement signals.

Step 203: The mobile terminal receives motion data of the target device from the trigger moment to the current measurement moment, and generates an original motion trail of the target device from the trigger moment to the current measurement moment according to the motion data of the target device from the trigger moment to the current measurement moment.

Step 204: The mobile terminal determines an effective motion trail of the target device according to the original motion trail of the target device and change rates of the azimuths of the target device relative to the mobile terminal at the moments.

For specific implementation manners of steps 202 to 204, refer to related description in the first embodiment, and details are not described herein.

Step 205: The mobile terminal obtains strength of a received signal sent by the target device at the current measurement moment, and determines a distance from the target device to the mobile terminal at the current measurement moment according to the strength of the signal and a preconfigured communication distance mapping table.

A short range communications technology has the following characteristic: A farther distance between two communication parties results in weaker strength of a received signal, and when a distance between the communication parties exceeds a particular threshold, a short range communications connection established by the communication parties is disconnected. Therefore, the distance between the communication parties may be determined according to the strength of the received signal by using the short range communications characteristic.

In this embodiment, the communication distance mapping table may be generated in a manner of performing measurement and collecting statistics in advance, and a mapping relationship between signal strength and a communication distance is stored in the communication distance mapping table. The mobile terminal obtains a distance between the target device and the mobile terminal at a measurement moment according to strength of a received signal sent by the target device at the current measurement moment and the communication distance mapping table.

In this embodiment, the mobile terminal determines, at each measurement moment, the azimuth of the target device relative to the mobile terminal, the distance from the target device to the mobile terminal, and the effective motion trail of the target device from the trigger moment to the measurement moment only after the motion status of the mobile terminal is inconsistent with the motion status of the target device, that is, after the trigger moment. There is no sequence when the mobile terminal determines the foregoing three parameters, and determining the foregoing parameters may be concurrently processed at the same time. Optionally, the mobile terminal may also measure the azimuth of the target device relative to the mobile terminal in real time, and record the motion trail of the target device, which is not limited in the disclosure.

Step 206: The mobile terminal determines location information of the target device at the current measurement moment according to an azimuth of the target device relative to the mobile terminal at the current measurement moment, the distance from the target device to the mobile terminal at the current measurement moment, the effective motion trail of the target device, and a pre-saved map, and displays the location information of the target device at the current measurement moment.

According to the method in this embodiment, a mobile terminal further determines a distance from a target device to the mobile terminal at a current measurement moment according to strength of a received signal sent by the target device at the current measurement moment; then determines location information of the target device according to an azimuth of the target device relative to the mobile terminal at the current measurement moment, the distance to the mobile terminal at the current measurement moment, an effective motion trail of the target device, and a map; and can provide more accurate location information to the target device, so that a user can quickly and accurately find the target device according to the location information of the target device.

Optionally, the mobile terminal in the second embodiment may determine whether to position the target device in the following manner: The mobile terminal determines whether strength of a received signal sent by the target device at the trigger moment is less than a preset received signal strength threshold; and if the strength of the signal is less than the preset received signal strength threshold, the mobile terminal determines to position the target device. The target device maintains a connection to the mobile terminal by using the short range communications technology. When the target device is moving away from the mobile device, the strength of the signal that is sent by the target device and received by the mobile device weakens. When a strength value of the signal decreases to the received signal strength threshold, the mobile terminal determines to position the target device. If the strength of the signal is not less than the preset received signal strength threshold, the mobile terminal determines not to position the target device. The signal sent by the target device at the trigger moment may be a broadcast signal or a data signal sent by the target device, where the data signal may be a signal of the motion data sent by the target device, or another data signal.

Figure 12:
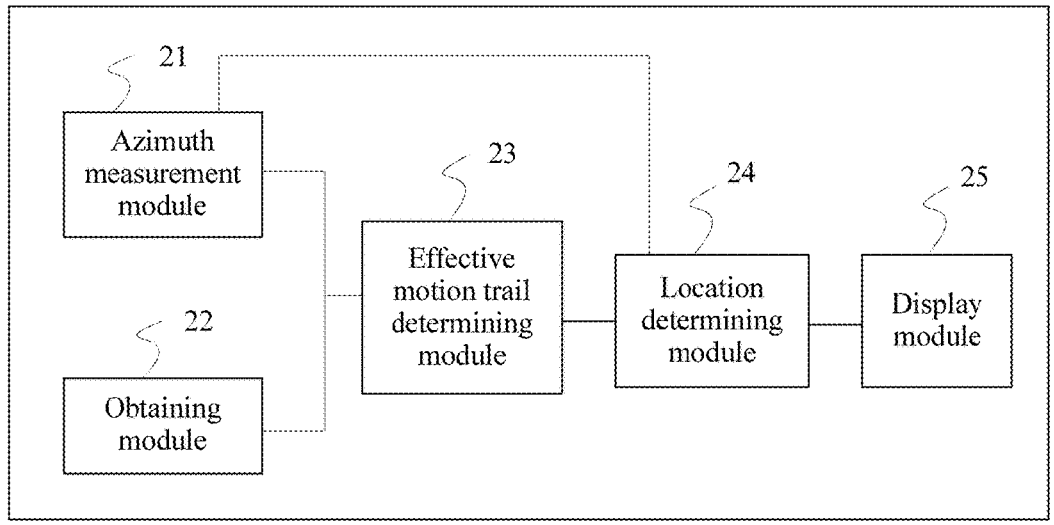
FIG. 12 is a schematic structural diagram of a mobile terminal according to a third embodiment of the disclosure.

FIG. 12 is a schematic structural diagram of a mobile terminal according to a third embodiment of the disclosure. As shown in FIG. 12, the mobile terminal provided in this embodiment includes an azimuth measurement module 21, an obtaining module 22, an effective motion trail determining module 23, a location determining module 24, and a display module 25.

The azimuth measurement module 21 is configured to obtain measurement signals sent by a target device from a trigger moment to a current measurement moment, and determine azimuths of the target device relative to the mobile terminal at the moments according to the measurement signals.

The obtaining module 22 is configured to obtain an original motion trail of the target device from the trigger moment to the current measurement moment.

The effective motion trail determining module 23 is configured to determine an effective motion trail of the target device according to the original motion trail and change rates of the azimuths of the target device relative to the mobile terminal at the moments.

The location determining module 24 is configured to perform matching with a map according to an azimuth of the target device relative to the mobile terminal at the current measurement moment and the effective motion trail of the target device, to determine location information of the target device at the current measurement moment.

The display module 25 is configured to display the location information of the target device at the current measurement moment.

The obtaining module 22 is configured to receive motion data of the target device from the trigger moment to the current measurement moment, and generate the original motion trail according to the motion data of the target device from the trigger moment to the current measurement moment; or receive the original motion trail sent by the target device, where the original motion trail is generated by the target device according to motion data that is of the target device from the trigger moment to the current measurement moment and obtained by means of measurement.

In this embodiment, the mobile terminal communicates with the target device in a short range communications manner.

The mobile terminal provided in this embodiment may be configured to execute the technical solution provided in the first embodiment. Specific implementation manners and technical effects are similar, and details are not described herein.

Figure 13:
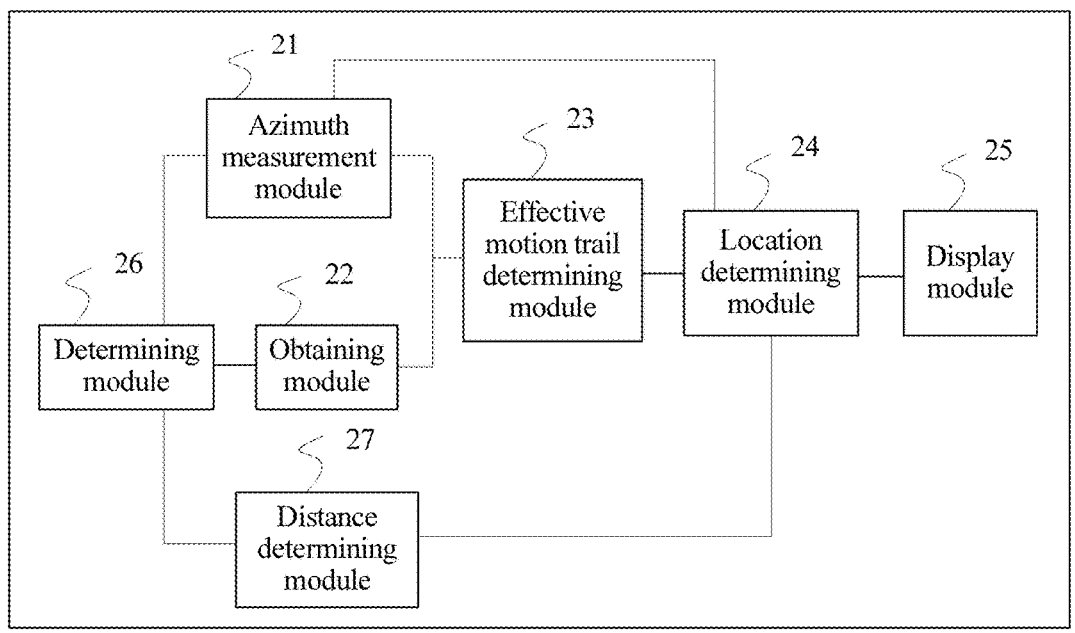
FIG. 13 is a schematic structural diagram of a mobile terminal according to a fourth embodiment of the disclosure.

FIG. 13 is a schematic structural diagram of a mobile terminal according to a fourth embodiment of the disclosure. As shown in FIG. 13, based on the mobile terminal shown in FIG. 12, the mobile terminal provided in this embodiment further includes a determining module 26 and a distance determining module 27.

The determining module 26 is configured to determine whether a motion status of the target device at the trigger moment is the same as a motion status of the mobile terminal at the trigger moment according to the motion data of the target device at the trigger moment and motion data of the mobile terminal at the trigger moment; and determine to position the target device if the motion status of the target device at the trigger moment is different from the motion status of the mobile terminal at the trigger moment. Alternatively, the determining module 26 determines whether strength of a signal that is sent by the target device at the trigger moment and received by the mobile terminal is less than a preset received signal strength threshold; and determines to position the target device if the strength of the signal is less than the preset received signal strength threshold.

The distance determining module 27 is configured to obtain strength of a signal that is sent by the target device at the current measurement moment and received by the mobile terminal, and determine a distance from the target device to the mobile terminal at the current measurement moment according to the strength of the signal and a preconfigured communication distance mapping table.

Correspondingly, the location determining module 24 is further configured to perform matching with the map according to the azimuth of the target device relative to the mobile terminal at the current measurement moment, the effective motion trail of the target device, and the distance from the target device to the mobile terminal at the current measurement moment, to determine a location of the target device.

The mobile terminal provided in this embodiment may be configured to execute the technical solution in the second embodiment. Specific implementation manners and technical effects thereof are similar, and details are not described herein.

Figure 14:
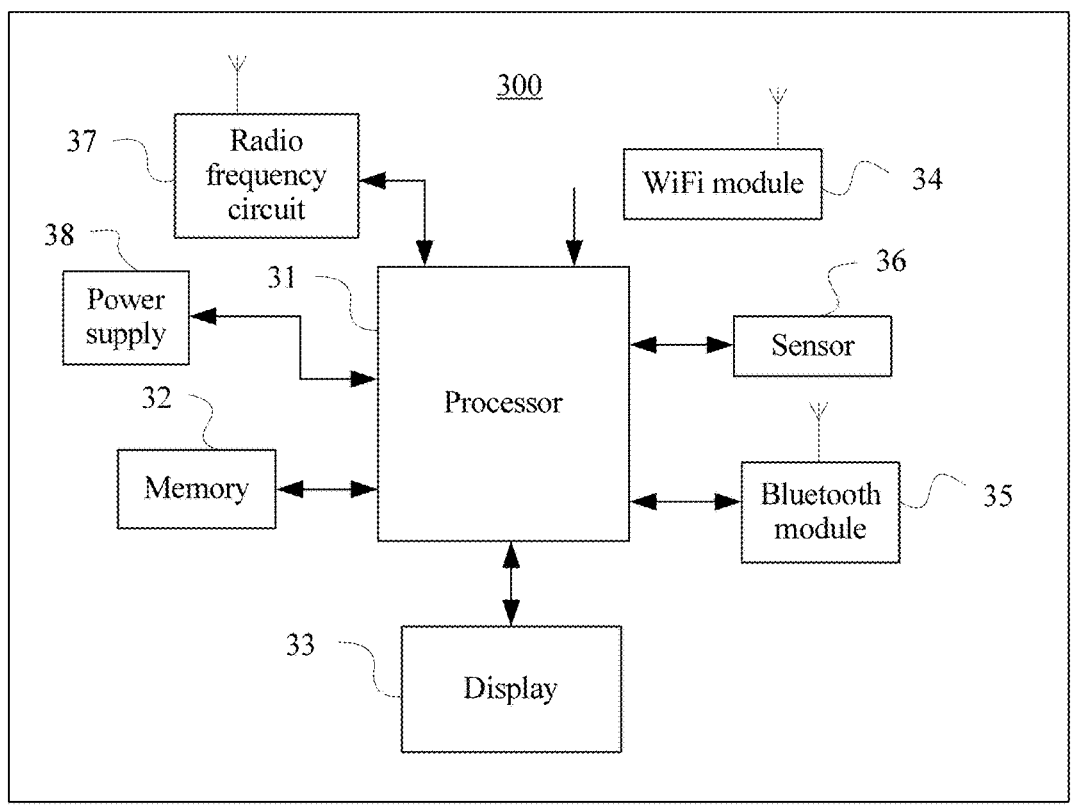
FIG. 14 is a schematic structural diagram of a mobile terminal according to a fifth embodiment of the disclosure.

FIG. 14 is a schematic structural diagram of a mobile terminal according to a fifth embodiment of the disclosure. As shown in FIG. 14, the mobile terminal provided in this embodiment may be configured to implement the methods of the first embodiment and the second embodiment of the disclosure. For ease of description, only a part related to this embodiment of the disclosure is shown. For specific technical details that are not disclosed, refer to the description in the first method embodiment and the second embodiment of the disclosure. The mobile device may be a device such as a mobile phone, a tablet computer, or a PDA.

That the mobile device is a mobile phone is used as an example in this embodiment. FIG. 14 shows a block diagram of a partial structure of a mobile terminal 300 provided in this embodiment of the disclosure. In this embodiment, only parts related to the positioning method are described. Referring to FIG. 14, a mobile phone 300 includes parts such as a processor 31, a memory 32, a display 33, a WI-FI module 34, a BLUETOOTH module 35, a sensor 36, a radio frequency (RF) circuit 37, and a power supply 38. A person killed in the art may understand that the structure of the mobile terminal shown in FIG. 14 does not constitute a limitation on the mobile terminal, and may include parts more or fewer than those shown in the figure, or a combination of some parts, or different part arrangements. Although not shown in the figure, parts such as a camera and an audio frequency circuit may further be included in the mobile terminal 300, and details are not described herein.

The memory 32 may be configured to store a computer executable program, and the processor 31 implements, by running the computer executable program stored in the memory 32, the target device positioning method provided in the embodiments of the disclosure.

The processor 31 is a control center of the mobile terminal, and connected to parts of the entire mobile terminal by using various interfaces and lines, and executes various functions of the mobile terminal 300 and processes data by running or executing the computer executable program stored in the memory 31 and by invoking data stored in the memory 31. Preferably, an application processor and a modem processor may be integrated into the processor 31, where the application processor mainly processes an operating system, a user interface, an application program, and the like; and the modem processor mainly processes wireless communications. It may be understood that the foregoing modem processor may not be integrated into the processor 31.

The display 33 is configured to display a corresponding result to a user according to a result of processing by the processor 31, and the display 33 may use a touchscreen having an input function.

The WI-FI module 34 and the BLUETOOTH module 35 are configured to establish short range communications with a target device, the WI-FI module 34 and the BLUETOOTH module 35 may receive a wireless signal by using a multi-antenna array, and the sensor 36 is configured to collect motion data of the mobile phone 300.

In this embodiment, the processor 31 and the display 33 have the following functions: obtaining measurement signals sent by the target device from a trigger moment to a current measurement moment, and determining azimuths of the target device relative to the mobile terminal at the moments according to the measurement signals; obtaining an original motion trail of the target device from the trigger moment to the current measurement moment; determining an effective motion trail of the target device according to the original motion trail and change rates of the azimuths of the target device relative to the mobile terminal at the moments; and performing matching with a map according to an azimuth of the target device relative to the mobile terminal at the current measurement moment and the effective motion trail of the target device, to determine location information of the target device at the current measurement moment, and displaying the location information of the target device at the current measurement moment.

The processor 31 obtains an original motion trail of the target device from the trigger moment to the current measurement moment by receiving motion data of the target device from the trigger moment to the current measurement moment, and generating the original motion trail according to the motion data of the target device from the trigger moment to the current measurement moment; or receiving the original motion trail sent by the target device, where the original motion trail is generated by the target device according to motion data that is of the target device from the trigger moment to the current measurement moment and obtained by means of measurement.

Optionally, the processor 31 is further configured to determine whether a motion status of the target device at the trigger moment is the same as a motion status of the mobile terminal at the trigger moment according to the motion data of the target device at the trigger moment and motion data of the mobile terminal at the trigger moment; and determine to position the target device if the motion status of the target device at the trigger moment is different from the motion status of the mobile terminal at the trigger moment; or determine whether strength of a received signal sent by the target device at the trigger moment is less than a preset received signal strength threshold; and determine to position the target device if the strength of the signal is less than the preset received signal strength threshold.

Optionally, the processor 31 is further configured to obtain strength of a signal that is sent by the target device at the current measurement moment and received by the mobile terminal, and determine a distance from the target device to the mobile terminal at the current measurement moment according to the strength of the signal and a preconfigured communication distance mapping table; and perform matching with the map according to the azimuth of the target device relative to the mobile terminal at the current measurement moment, the effective motion trail of the target device, and the distance from the target device to the mobile terminal at the current measurement moment, to determine a location of the target device.

In this embodiment, the mobile terminal communicates with the target device in a short range communications manner.

The mobile terminal provided in this embodiment may be configured to execute the technical solutions in the first method embodiment and the second embodiment.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The foregoing described apparatus embodiment is merely exemplary, where the units described as separate parts may or may not be physically separate.

In the several embodiments provided in the present application, it should be understood that the disclosed system, apparatus, and method may be implemented in other manners. For example, the described apparatus embodiments are merely exemplary. For example, the module division is merely logical function division and may be other division in actual implementation. For example, a plurality of modules or components may be combined or integrated into another system.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the disclosure, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the disclosure.

What is claimed is:

1. A target device positioning method, comprising:
    obtaining, by a mobile terminal, measurement signals from a target device from a trigger moment to a current measurement moment when a motion status of the target device is different than a motion status of the mobile terminal;
    determining a distance from the target device to the mobile terminal at the current measurement moment;
    determining a phase difference of the measurement signals from the target device from the trigger moment to the current measurement moment;
    determining azimuths of the target device relative to the mobile terminal at the trigger and current measurement moments according to the phase difference of the measurement signals from the target device from the trigger moment to the current measurement moment;
    obtaining, by the mobile terminal, an original motion trail of the target device from the trigger moment to the current measurement moment;

determining, by the mobile terminal, an effective motion trail of the target device according to the original motion trail, distances from the target device to the mobile device at the current measurement moment, and rates of change of the azimuths of the target device relative to the mobile terminal at the trigger and current measurement moments;

matching, by the mobile terminal, with a map according to an azimuth of the target device relative to the mobile terminal at the current measurement moment and the effective motion trail of the target device to determine location information of the target device at the current measurement moment; and displaying the location information of the target device at the current measurement moment.

2. The method according to claim 1, wherein obtaining, by the mobile terminal, the original motion trail of the target device from the trigger moment to the current measurement moment comprises:

receiving, by the mobile terminal, motion data of the target device from the trigger moment to the current measurement moment, and generating the original motion trail according to the motion data of the target device from the trigger moment to the current measurement moment.

3. The method according to claim 2, further comprising:

determining, by the mobile terminal, whether a motion status of the target device at the trigger moment is the same as a motion status of the mobile terminal at the trigger moment using the motion data of the target device at the trigger moment and motion data of the mobile terminal at the trigger moment; and determining, by the mobile terminal, a position of the target device if the motion status of the target device at the trigger moment is different from the motion status of the mobile terminal at the trigger moment.

4. The method according to claim 1, wherein obtaining, by the mobile terminal, the original motion trail of the target device from the trigger moment to the current measurement moment comprises receiving, by the mobile terminal, the original motion trail from the target device, wherein the original motion trail of the target device is generated from motion data of the target device from the trigger moment to the current measurement moment and obtained through measurement.

5. The method according to claim 1, further comprising:

determining, by the mobile terminal, whether a strength of a received signal from the target device at the trigger moment is less than a preset received signal strength threshold; and determining, by the mobile terminal, a position of the target device if the strength of the received signal is less than the preset received signal strength threshold.

6. The method according to claim 1, further comprising:

obtaining, by the mobile terminal, a strength of a received signal from the target device at the current measurement moment; and determining the distance from the target device to the mobile terminal at the current measurement moment according to the strength of the measurement signals and a preconfigured communication distance mapping table, wherein matching with the map according to the azimuths of the target device relative to the mobile terminal at the current measurement moment and the effective motion trail of the target device to determine a location of the target device further comprises: matching with the map according to the azimuths of the target device relative to the mobile terminal at the current measurement moment, the effective motion trail of the target device, and the distance from the target device to the mobile terminal at the current measurement moment.

7. The method according to claim 1, further comprising communicating by the mobile terminal with the target device in a short range communications manner.

8. A mobile terminal, comprising:

a memory comprising instructions; and a processor coupled to the memory, wherein the instructions cause the processor to be configured to:

obtain measurement signals from a target device from a trigger moment to a current measurement moment when a motion status of the target device is different than a motion status of the mobile terminal;

determine a distance from the target device to the mobile terminal at the current measurement moment;

determine a phase difference of the measurement signals from the target device from the trigger moment to the current measurement moment;

determine azimuths of the target device relative to the mobile terminal at the trigger and current measurement moments according to the phase difference of the measurement signals from the target device from the trigger moment to the current measurement moment;

obtain an original motion trail of the target device from the trigger moment to the current measurement moment;

determine an effective motion trail of the target device according to the original motion trail, distances from the target device to the mobile device at the current measurement moment, and rates of change of the azimuths of the target device relative to the mobile terminal at the trigger and current measurement moments;

match with a map according to an azimuth of the target device relative to the mobile terminal at the current measurement moment and the effective motion trail of the target device to determine location information of the target device at the current measurement moment; and display the location information of the target device at the current measurement moment.

9. The mobile terminal according to claim 8, wherein the instructions further cause the processor to be configured to:

receive motion data of the target device from the trigger moment to the current measurement moment; and generate the original motion trail according to the motion data of the target device from the trigger moment to the current measurement moment.

10. The mobile terminal according to claim 9, wherein the instructions further cause the processor to be configured to:

determine whether a motion status of the target device at the trigger moment is the same as a motion status of the mobile terminal at the trigger moment according to the motion data of the target device at the trigger moment and motion data of the mobile terminal at the trigger moment; and determine a position of the target device when the motion status of the target device at the trigger moment is different from the motion status of the mobile terminal at the trigger moment.

11. The mobile terminal according to claim 8, wherein the instructions further cause the processor to be configured to receive the original motion trail from the target device, wherein the original motion trail of the target device is generated from motion data of the target device from the trigger moment to the current measurement moment, and wherein the original motion trail is obtained through measurement.

12. The mobile terminal according to claim 8, wherein the instructions further cause the processor to be configured to:
  determine whether a strength of a signal from the target device at the trigger moment is less than a preset received signal strength threshold; and
  determine a position of the target device when the strength of the signal is less than the preset received signal strength threshold.

13. The mobile terminal according to claim 8, wherein the instructions further cause the processor to be configured to:
  obtain a strength of a signal from the target device at the current measurement moment;
  determine the distance from the target device to the mobile terminal at the current measurement moment according to the strength of the signal and a preconfigured communication distance mapping table; and
  match with the map according to the azimuths of the target device relative to the mobile terminal at the current measurement moment, the effective motion trail of the target device, and the distance from the target device to the mobile terminal at the current measurement moment to determine a location of the target device.

14. The mobile terminal according to claim 8, wherein the instructions further cause the processor to be configured to communicate with the target device in a short range communications manner.

\* \* \* \* \*